United States Patent [19]

Dawson et al.

[11] 4,417,790

[45] Nov. 29, 1983

[54] FINISHED OPHTHALMIC LENS COMPRISING AN OPTICAL SMOOTH COATING OVER A ROUGH-SURFACED BASE

[75] Inventors: W. Clifford Dawson, East Woodstock; George D. Bard, Brooklyn, both of Conn.; Luther W. Smith, Brimfield; Bernard L. Laurin, Ludlow, both of Mass.

[73] Assignee: American Optical Corporation, Southbridge, Mass.

[21] Appl. No.: 37,786

[22] Filed: May 10, 1979

[51] Int. Cl.³ ............................ G02B 1/10; G02C 7/02
[52] U.S. Cl. ....................... 351/166; 350/409; 427/164; 427/165; 428/412; 428/428; 428/429; 428/446; 428/447; 428/451; 428/452
[58] Field of Search ............... 428/412, 428, 429, 446, 428/447, 451, 452; 351/166; 350/175 R, 175 NG, 409; 427/164, 165

[56] References Cited

U.S. PATENT DOCUMENTS

| | | | |
|---|---|---|---|
| 3,458,348 | 7/1969 | Sherman | 351/166 |
| 3,533,897 | 10/1970 | Robbins et al. | 351/166 |
| 3,986,997 | 10/1976 | Clark | 260/29.2 |
| 3,998,531 | 12/1976 | Margouk | 351/166 |
| 4,127,682 | 11/1978 | Laurin | 427/165 |
| 4,127,697 | 11/1978 | Laurin | 428/412 |
| 4,229,228 | 10/1980 | Rotenberg et al. | 350/409 |
| 4,319,945 | 3/1982 | Howden | 427/165 |
| 4,332,861 | 6/1982 | Frang et al. | 427/164 |
| 4,338,375 | 7/1982 | Hashimoto et al. | 427/164 |
| 4,343,857 | 8/1982 | Vram | 351/166 |

FOREIGN PATENT DOCUMENTS 53-111336 9/1978 Japan.

*Primary Examiner*—James C. Cannon
*Attorney, Agent, or Firm*—Kenway & Jenney

[57] ABSTRACT

A cut and/or ground ophthalmic lens surface is finished to optical smoothness and clarity by direct coating with a transparent liquid material which is curable into a clear, tough and tenacious laminate.

13 Claims, 3 Drawing Figures

FINISHED OPHTHALMIC LENS COMPRISING AN OPTICAL SMOOTH COATING OVER A ROUGH-SURFACED BASE

BACKGROUND OF THE INVENTION

1. Field of the Invention:

This invention relates to the manufacture of ophthalmic lenses and has particular reference to the finishing of cut and/or ground lens surfaces.

2. Discussion of the Prior Art:

Ophthalmic lens surfaces which are machined to prescription curvatures with cutting tools and/or loose abrasives exhibit tool and/or abrasive marks which produce the well-known "gray" effect needing to be removed by further working.

Heretofore, removal of machined surface roughness has required fine grinding and polishing operations which are time consuming, tedious and costly to perform and require large investment in capital equipment. Additionally, in the manufacture of plastic opthalmic lenses which are conventionally fine ground and polished, it is considered desirable, if not necessary, to incur the additional manufacturing time and cost of covering the polished surfaces with a tough and optically clear material for enhancement of scratch resistance as disclosed in U.S. Pat. Nos. 3,986,997 and 4,127,697, for example.

In view of the aforesaid drawbacks of prior art high capital equipment cost, undue expenditure of manufacturing time and other high costliness of finishing machined ophthalmic lens surfaces, it is a principal object of this invention to provide a lens surface finishing operation which obviates the need for much, if not all, of the traditional finishing equipment and procedures and wherewith an optimum optically clear, highly scratch resistant lens surface may be produced simply, rapidly and economically.

More specifically, it is an object of the invention to provide optically clear finishes on machined lens surfaces without the need for lens polishing operations; and Another object is to accomplish the foregoing with simultaneous provision of end product high scratch resistance.

Other objects and advantages of the invention will become apparent from the following description.

SUMMARY OF THE INVENTION

The foregoing objects and their corollaries are accomplished by coating a machine cut or ground surface of an ophthalmic lens substrate with a liquid material, e.g. a pigment-free aqueous composition, which will cure into a tough tenacious and highly scratch resistant optically clear laminate. By such means, the surface roughness of the machined lens surface, whether glass or plastic, may be smoothly covered with the coating material to eliminate the effect of light scattering and afford optimum transparency.

Details of the invention will become more readily understood by reference to the following description when taken in conjunction with the accompanying drawings.

DESCRIPTION OF THE PREFERRED EMBODIMENTS

Figure 1:
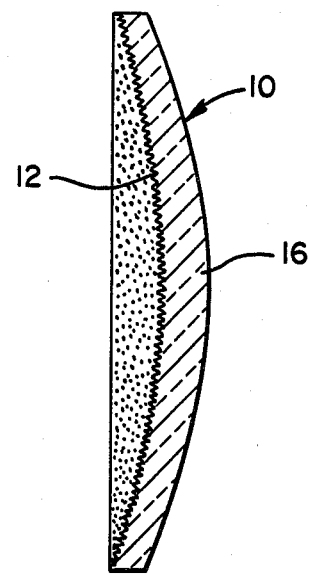
FIG. 1 is an illustration in cross-section of an ophthalmic lens having a machined concave surface needing to be optically finished.

In the drawings, FIG. 1 is an illustration of an ophthalmic lens 10 having a concave surface 12 machined to prescription curvature, e.g. by fly-cutting, diamond tool generating or loose abrasive surfacing. As such, surface 12 is left with a roughness which may comprise randomly sized and shaped peaks and depressions. All such and other forms of roughness produced by machine cutting or abrading cause scattering of incident light which renders the lens translucent and of "gray" finish. This well-known "gray" finish (i.e. translucency), not being of optical quality and completely unacceptable for ophthalmic use, requires working to optical smoothness for optimum clarity. To this end, the present invention eliminates the traditional final steps of fine grinding and polishing and, instead, dips, sprays, spin coats, doctors or otherwise applies an optically clear coating 14 to surface 12.

Coating 14 is so formulated as to initially flow in low viscosity liquid form into the aforesaid roughness of surface 12 and be curable, e.g. with application of heat, into an optically clear, tough and tenacious laminate.

Figure 2:
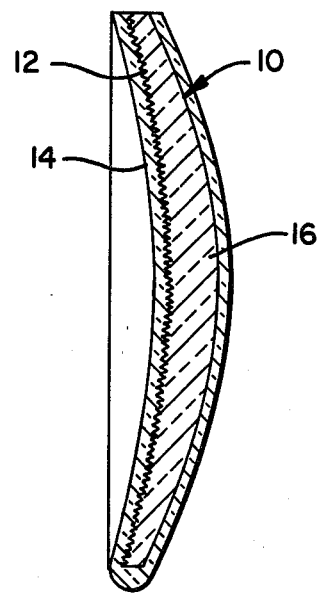
FIG. 2 illustrates the same lens after coating for optical finishing according to one aspect of the invention.
Figure 3:
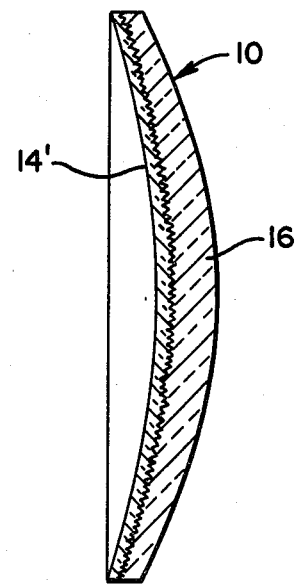
FIG. 3 illustrates an alternative manner of coating for optical finishing.

FIG. 2 is an illustration of a dip-coated lens wherein the coating 14 surrounds the lens substrate 16 and FIG. 3 illustrates a single surface coating 14' applied by spraying, pouring, flow or spin coating, doctoring or other such means of application.

The invention is applicable to all forms of ophthalmic lens media including thermosetting and thermoplastic materials of which allyl diglycol carbonate, polymethylmethacrylate and polycarbonate are exemplary. Optical quality styrene and cellulosic plastics such as cellulose acetate and cellulose propionate are further adaptable to coating according to the invention, as is glass.

A pigment-free aqueous coating composition and a number of specific examples thereof which are suitable for performing the aforesaid function and end product are disclosed in U.S. Pat. No. 3,986,997 together with methods of application. The coating is a pigment-free aqueous coating composition comprising a dispersion of colloidal silica in lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate.

Lenses coated according to the disclosure of U.S. Pat. No. 3,986,997 may also incorporate tie coatings such as are set forth in U.S. Pat. No. 4,127,697.

Other suitable priming and coating compositions, with methods of application, are disclosed in assignee's co-pending application Ser. No. 897,317 filed on Apr. 18, 1978 in the names of Don H. Rotenberg et al., and now U.S. Pat. No. 4,173,490 and continuation-in-part application Ser. No. 948,595 filed on Oct. 4, 1978, and now U.S. Pat. No. 4,229,228. These coating compositions are hydrolysis products of about 35 to 70 weight percent tetraethyl orthosilicate and 55 to 20 weight percent of a silane selected from the group consisting of methyltrimethoxysilane, methyltriethoxysilane, ethyltrimethoxysilane, ethyltriethoxysilane, dimethyldimethoxysilane, dimethyldiethoxysilane and mixtures thereof and up to 20 weight percent of a siloxane having a reactive polar site.

A further desirable coating composition is disclosed in Japanese application for Patent No. 52-26109 filed on Mar. 11, 1977 in the names of Masaharu Suzuki, et al by Toray Industries, Inc. of Tokyo, Japan and published on Sept. 28, 1978 under Disclosure No. 53-111336. This composition consists essentially of a mixture of one or more compounds selected from a group of compounds including one or both of epoxy group, and silanol and/or siloxane group (provided, in any case so selected that epoxy group, and silanol and/or siloxane group are included in the same molecule or different molecule); silica particle having a size of 1 to 100 microns; and aluminum chelate compound of a general formula:

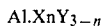

$Al.XnY_{3-n}$ wherein X is OL (L: lower alkyl), Y is at least a ligand derived from compounds of general formula $M^1COCH_2COM^2$ ($M^1$, $M^2$ both lower alkyl) and a ligand derived from compounds of general formula $M^3COCH_2COOM^4$ ($M^3$ both lower alkyl) and n is 0, 1 or 2.

An ophthalmic lens substrate formed of allyl diglycol carbonate (CR39 ®) may also be primed for adequate bonding of the aforesaid coating compositions by dipping in an aqueous solution of sodium hydroxide maintained at a temperature of approximately 23° C. followed by air drying at approximately 20° C. This treatment of allyl diglycol carbonate lenses for subsequent coating purposes is set forth in U.S. Pat. No. 4,127,682 (Column 5, Example 1). U.S. Pat. No. 4,127,682 further sets forth a desirable pretreatment for optical elements formed of a polycarbonate (Column 6, Example 2).

It has been determined that a thickness of coating 14 or 14' (FIGS. 2 and 3) of approximately ten times the depth of machined surface roughness will produce a finish of optical quality. With an approximate depth of surface roughness of 0.8 micron and use of one or more of the coating compositions of U.S. Pat. No. 3,986,997, dip coating may be accomplished at room temperature with a lens withdrawal rate of approximately seven and one-half inches per minute from the coating solution and air drying for approximately 15 minutes. Final curing may be accomplished in approximately 8 hours with the lens subjected to a temperature of approximately 220° F. This will provide a coating thickness of approximately 4 microns.

Repeating the above procedure will provide the aforesaid coating thickness of approximately ten times the depth of original surface roughness, i.e. a final thickness of approximately 8 microns.

Regarding the expressions "optical smoothness", "optical clarity" and "optical quality", those interested in detailed technical definitions thereof may refer to Optical Glassworking by F. Twyman published in 1955 by Hilger and Watts Limited of London (pages 154 et seq.). Furthermore, the term "lens", as used herein, is intended to include all forms of such articles, i.e. whether in the configuration of blanks with only one side optically finished, both sides finished and/or uncut or cut to final diametral sizes and edge contours.

We claim:

1. An ophthalmic lens including substrate having a machined and unpolished rough surface and a finish thereover of optical smoothness, clarity and high scratch resistance comprising a coating selected from the group consisting of:
    (a) a pigment-free aqueous coating composition comprising a dispersion of colloidal silica in lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3 trifluoropropyl radical, the gamma-glycidoxypropyl radical and the gamma-methzcryloxypropyl radical, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate;
    (b) a hydrolysis product of about 35 to 70 weight percent tetraethyl orthosilicate and 55 to 20 weight percent of a silane selected from the group consisting of methyltrimethoxysilane, methyltriethoxysilane, ethyltrimethoxysilane, ethyltriethoxysilane, dimethyldimethoxysilane, dimethyldiethoxysilane and mixtures thereof and up to 20 weight percent of a siloxane having a reactive polar site; and
    (c) a mixture of one or more compounds selected from a group of compounds including one or both of epoxy group, and silanol and/or siloxane group (provided, in any case so selected that epoxy group, and silanol and/or siloxane group are included in the same molecule or different molecule); silica particles having a size of 1 to 100 microns; and an aluminum chelate compound of a general formula:

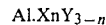

$Al.XnY_{3-n}$ wherein X is OL (L: lower alkyl), Y is at least a ligand derived from compounds of general formula $M^1COCH_2COM^2$ ($M^1$, $M^2$ both lower alkyl) and a ligand derived from compounds of general formula $M^3COCH_2COOM^4$ ($M^3$, $M^4$ both lower alkyl) and n is 0, 1 or 2.

2. An ophthalmic lens according to claim 1 wherein the thickness dimension of said coating is at least approximately ten times the dimension of depth of roughness of said machined and unpolished surface.

3. An opthalmic lens according to claim 2 wherein said coating comprises a multiplicity of layers of materials of said coating selected from said group thereof.

4. An ophthalmic lens according to claim 1 wherein said substrate is formed of a thermosetting material over which said selected coating is applied.

5. An ophthalmic lens according to claim 4 wherein said thermosetting material is allyl diglycol carbonate.

6. An ophthalmic lens according to claim 1 wherein said substrate is formed of a thermoplastic material over which said selected coating is applied.

7. An opthalmic lens according to claim 6 wherein said thermoplastic material is a polycarbonate.

8. The method of finishing an opthalmic lens having a machined and unpolished rough surface comprising the steps of:

coating said rough surface with a liquid pigment-free aqueous composition which is curable to external optical smoothness, clarity and high scratch resistance; and curing said coating.

9. The method according to claim 8 including the step of priming said machined and unpolished rough surface prior to said step of coating.

10. The method according to claim 8 wherein said coating is selected from the group consisting of:
(a) a pigment-free aqueous coating composition comprising a dispersion of colloidal silica in lower aliphatic alcohol-water solution of the partial condensate of a silanol of the formula RSi(OH)$_3$ in which R is selected from the group consisting of alkyl radicals of 1 to 3 inclusive carbon atoms, the vinyl radical, the 3,3,3-trifluoropropyl radical the gamma-glycidoxypropyl radical and the gamma-methacryloxypropyl radical, at least 70 weight percent of the silanol being CH$_3$Si(OH)$_3$, said composition containing 10 to 50 weight percent solids consisting essentially of 10 to 70 weight percent colloidal silica and 30 to 90 weight percent of the partial condensate; and
(b) a hydrolysis product of about 35 to 70 weight percent tetraethyl orthosilicate and 55 to 20 weight percent of a silane selected from the group consisting of methyltrimethoxysilane, methyltrietheoxysilane, ethyltrimethoxysilane, ethyltriethoxysilane, dimethyldimethoxysilane, dimethyldiethoxysilane and mixtures thereof and up to 20 weight percent of a siloxane having a reactive polar site; and
(c) a mixture of one or more compounds selected from a group of compounds including one or both of epoxy group, and silanol and/or siloxane group (provided, in any case so selected that epoxy group, and silanol and/or siloxane group are included in the same molecule or different molecule); silica particles having a size of 1 to 100 microns; and an aluminum chelate compound of a general formula:

$$Al.X_nY_{3-n}$$

wherein X is OL (L: lower alkyl), Y is at least a ligand derived from compounds of general formula M$^1$COCH$_2$COM$^2$ (M$^1$, M$^2$ both lower alkyl) and a ligand derived from compounds of general formula M$^3$COCH$_2$COOM$^4$ (M$^3$, M$^4$ both lower alkyl) and n is 0, 1 or 2.

11. The method according to claim 10 wherein said lens comprises a substrate formed of allyl diglycol carbonate and said rough surface is primed by hydrolysis.

12. The method according to claim 8 wherein said lens is coated to a final thickness dimension greater than ten times the dimension of depth of said roughness of said machined and unpolished surface.

13. The method according to claim 8 wherein said steps of coating and curing are repeated.

* * * * *